United States Patent
Ruth et al.

(10) Patent No.: US 12,462,313 B2
(45) Date of Patent: Nov. 4, 2025

(54) ENERGY DISPATCH OPTIMIZATION USING A FLEET OF DISTRIBUTED ENERGY RESOURCES

(71) Applicant: Power Management Holdings (U.S.), Inc., Waukesha, WI (US)

(72) Inventors: Michael K. Ruth, Longmont, CO (US); Duncan R. Brown, Squamish (CA); Andrew R. Gassner, Garibaldi Highlands (CA)

(73) Assignee: Power Management Holdings (U.S.), Inc., Waukesha, WI (US)

( * ) Notice: Subject to any disclaimer, the term of this patent is extended or adjusted under 35 U.S.C. 154(b) by 20 days.

(21) Appl. No.: 18/458,653

(22) Filed: Aug. 30, 2023

(65) Prior Publication Data

US 2024/0127370 A1 Apr. 18, 2024

Related U.S. Application Data

(60) Provisional application No. 63/373,888, filed on Aug. 30, 2022.

(51) Int. Cl.
G06Q 50/06 (2024.01)

(52) U.S. Cl.
CPC .................... G06Q 50/06 (2013.01)

(58) Field of Classification Search
None
See application file for complete search history.

(56) References Cited

U.S. PATENT DOCUMENTS

| | | | |
|---|---|---|---|
| 2014/0012428 A1* | 1/2014 | Taniguchi | H02J 7/35 700/291 |
| 2015/0214776 A1 | 7/2015 | Ukita et al. | |
| 2016/0141873 A1 | 5/2016 | Ellice-Flint et al. | |
| 2016/0352786 A1* | 12/2016 | Shelton | H04L 65/1073 |

(Continued)

FOREIGN PATENT DOCUMENTS

| | | |
|---|---|---|
| EP | 2816699 A1 | 12/2014 |
| EP | 3098927 A1 | 11/2016 |
| JP | 2018191500 A * | 11/2018 |

OTHER PUBLICATIONS

Nazari et al.; "Electric Vehicles for Smart Buildings: A Survey on Applications, Energy Management Methods, and Battery Degradation"; Jun. 2021; IEEE; vol. 109, Issue 6; pp. 1128-1144 (Year: 2021).*

(Continued)

*Primary Examiner* — Jeff Zimmerman
*Assistant Examiner* — Jorge G Del Toro-Ortega
(74) *Attorney, Agent, or Firm* — Merchant & Gould P.C.

(57) ABSTRACT

A dispatch optimization system and virtual power plant can be utilized and controlled in order to support the operations of a power distribution system. For example, upon determining an electrical need, the dispatch optimization system and/or virtual power plant may make an energy adjustment by allocating the energy adjustment among distributed energy resources of a fleet of distributed energy resources in order to achieve the energy adjustment. The dispatch optimization system and/or virtual power plant may determine the allocation among the distributed energy resources based on the economic costs and storage costs to use each distributed energy resource.

19 Claims, 8 Drawing Sheets

(56) References Cited

U.S. PATENT DOCUMENTS

2021/0021126 A1* 1/2021 Hall .......................... H02J 3/28
2022/0149619 A1 5/2022 Harsamizadeh Tehrani et al.

OTHER PUBLICATIONS

Enbala; Enbala Announces Most Advanced DER Control Platform Release; PV Magazine USA; https://pv-magazine-usa.com/press-releases/enbala-announces-most-advaneed-der-control-platform-releasel; Jan. 29, 2018; 3 pages.

PCT International Searching Authority, The International Search Report and The Written Opinion for PCT/US2023/073196 mailed on Jan. 30, 2024, 13 pages.

* cited by examiner

ENERGY DISPATCH OPTIMIZATION USING A FLEET OF DISTRIBUTED ENERGY RESOURCES

CROSS-REFERENCE TO RELATED APPLICATION(S)

This application claims priority to U.S. Application No. 63/373,888, filed on Aug. 30, 2022, and titled ENERGY DISPATCH OPTIMIZATION USING A FLEET OF DISTRIBUTED ENERGY RESOURCES, the disclosure of which is hereby incorporated by reference in its entirety.

BACKGROUND

Power grids are commonly connected to distributed energy resources that can be located anywhere on the grid. The distributed energy resources can be used to consume or produce power on the grid. For example, a distributed energy resource may consume or produce power to respond to an event on the grid requiring additional power production or consumption. When a distributed energy resource is used to consume or produce power, there is an economic cost of controlling and using the distributed energy resource.

Each distributed energy resource may have an ideal storage level. For example, a distributed energy resource's ideal storage level may be the maximum storage level of the distributed energy resource. The distributed energy resource at its maximum storage level will be able to discharge the stored power in response to future events on the power grid such as a peak time of power consumption. In another example, the distributed energy resource's ideal storage level is half of the maximum storage level of the distributed energy resource. A distributed energy resource at half of its maximum storage level will be able to discharge or consume power in response to future power consumption and power generation events on the grid. When a distributed energy resource consumes or produces power, the distributed energy resource may move away from its ideal storage level. A storage cost is the deviation from the distributed energy resource's ideal power level when the distributed energy resource is used to produce or consume power.

SUMMARY

In general terms, this disclosure is directed to optimizing the use of distributed energy resources by blending the economic cost and storage cost to use each distributed energy resource. Using the blended cost, the selection of distributed energy resources to respond to an energy dispatch request is optimized.

One aspect is a method for optimizing the dispatch of energy, the method comprising: determining an energy need; determining a first subgroup of a fleet of distributed energy resources to use to meet the energy need based on an economic cost to use each distributed energy resource to meet a portion of the energy need; determining a second subgroup of the fleet of distributed energy resources to use to meet the energy need based on a storage cost to use each distributed energy resource to meet the portion of the energy need; and causing the first subgroup of the fleet of distributed energy resources and the second subgroup of the fleet of distributed energy resources to make energy adjustments to meet the energy need.

Another aspect is a dispatch optimization system comprising at least one processing device and at least one non-transitory computer-readable medium storing data instructions that, when executed by the at least one processing device, cause the dispatch optimization system to: determine an energy need; select a first distributed energy resource in a fleet of distributed energy resources to meet at least a portion of the energy need, selecting the first distributed energy resource including: determine a first economic cost to use the first distributed energy resource to dispatch energy to meet at least the portion of the energy need; determine a second economic cost to use a second distributed energy resource to dispatch energy to meet at least the portion of the energy need; determine the first economic cost and the second economic cost are within a range; determine a first storage cost to use the first distributed energy resource to dispatch energy to meet at least the portion of the energy need, the first storage cost comprising a level of deviation from an ideal storage level of the first distributed energy resource; determine a second storage cost to use the second distributed energy resource to dispatch energy to meet at least the portion of the energy need, the second storage cost comprising the level of deviation from the ideal storage level of the second distributed energy resource; and determine the first storage cost is less than the second storage cost; and instruct the first distributed energy resource to make an energy adjustment to meet the at least the portion of the energy need.

A further aspect is a method for optimizing the dispatch of energy, the method comprising: determining an energy need; determining an energy adjustment needed across a fleet of distributed energy resources to meet the energy need; determining an allocation of the energy adjustment among the fleet of distributed energy resources, determining the allocation comprising: determining an economic cost to use each distributed energy resource of the fleet of distributed energy resources to dispatch energy to meet the allocation of the energy adjustment; determining a first subgroup of the fleet of distributed energy resources to use to meet the energy need based on the economic cost to use each distributed energy resource; determining a second subgroup of distributed energy resources distinct from the first subgroup having economic costs within a threshold; determining a difference between a final level of deviation from an ideal storage level of each distributed energy resource of the second subgroup and a final storage level of each distributed energy resource of the second subgroup when used to dispatch energy to meet the allocation of the energy adjustment and a current level of deviation from the ideal storage level of each distributed energy resource of the second subgroup and a current storage level of each distributed energy resource of the second subgroup; determining a third subgroup of the fleet of distributed energy resources from the second subgroup to use to meet the energy need based on the difference between the final level of deviation and the current level of deviation for each distributed energy resource of the second subgroup; and determining the allocation of the energy adjustment among the first subgroup and the third subgroup; and instructing the distributed energy resources of the first subgroup and the third subgroup to make energy adjustments according to the allocation to meet the energy need.

Another aspect is a method for optimizing the dispatch of energy, the method comprising: determining an energy need; determining a subgroup of a fleet of distributed energy resources based on an ideal storage deviation value to use each distributed energy resources to meet a portion of the energy need; and causing the subgroup of the distributed energy resources to make energy adjustments to meet the energy need.

An additional aspect is a method for optimizing the dispatch of energy, the method comprising: determining an energy need; determining a subgroup of a fleet of distributed energy resources based on a difference between: a final level of deviation from an ideal storage level of each distributed energy resource and a final storage level of distributed energy resource when used to dispatch energy to meet the energy need; and a current level of deviation from the ideal storage level of each distributed energy resource and a current storage level of each distributed energy resource; and causing the subgroup of the distributed energy resources to make energy adjustments to meet the energy need.

DETAILED DESCRIPTION

Figure 1:
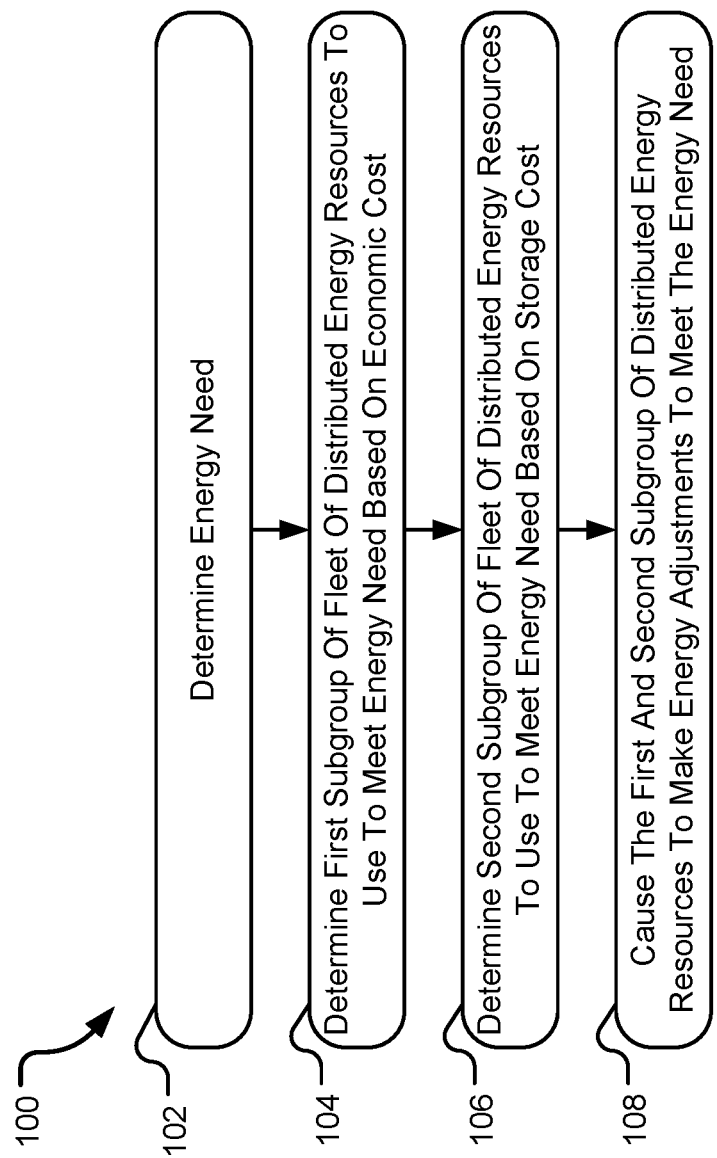
FIG. 1 is a flow chart illustrating an example method of controlling a fleet of distributed energy resources to meet an energy need.

Various examples will be described in detail with reference to the drawings, wherein like reference numerals represent like parts and assemblies throughout the several views. Reference to various example does not limit the scope of the claims attached hereto. Additionally, any examples set forth in this specification are not intended to be limiting and merely set forth some of the many possible examples for the appended claims.

The present disclosure describes an example dispatch optimization method and system involving a fleet of distributed energy resources ("DERs"), a dispatch optimization system, and a virtual power plant ("VPP"). The dispatch optimization system and virtual power plant can be utilized and controlled in order to support the operations of a power distribution system. For example, upon determining an electrical need, the dispatch optimization system and/or virtual power plant may make an energy adjustment. The energy adjustment can include charging and/or discharging. The dispatch optimization system and/or virtual power plant allocates the energy adjustment among the distributed energy resources of its fleet in order to achieve the energy adjustment.

A dispatch optimization system may determine which distributed energy resources of the fleet should be used to meet the energy need based on an economic cost and a storage cost to use each distributed energy resource. In examples, multiple DERs will be used to meet the energy need. The economic cost is the monetary cost to use the distributed energy resource, such as by receiving energy or discharging energy. A distributed energy resource's storage cost is the difference in the deviation from an ideal storage level of each distributed energy resource that will result from use for each distributed energy resource. For example, a distributed energy resource may have an ideal storage level of one hundred percent of its capacity. The distributed energy resource may have a current storage level of ninety percent of its capacity, and the storage level will drop to eighty percent if the distributed energy resource is used to meet a portion of the energy need. The storage cost would be higher than a distributed energy resource also having an ideal storage level of one hundred of its capacity and will drop from a state of one hundred percent to ninety percent.

In an example, the storage cost may be a negative value or set to a minimum value such as zero for a distributed energy resource, indicating that it would be beneficial to use the distributed energy resource to meet a portion of the energy need. For example, the ideal storage level of the distributed energy resource may be fifty percent, the current storage level sixty percent, and the resulting storage level if used fifty-five percent. The storage level of the distributed energy resource is moving closer to the ideal storage level when used to meet the energy need.

In some examples, a DER may not be capable of storing energy. The storage cost to use a DER with no storage capacity is zero or another minimum cost value. The minimum storage cost value indicates that it is beneficial to use the DER with no storage capacity to meet the energy need when evaluating DERs based on storage cost.

In some examples, the economic cost and/or storage cost to use multiple DERs may be identical or nearly identical (e.g., within a range). A dispatch optimization system may consider a health value of the DERs to determine which DERs to use that have the same or similar economic costs and/or storage costs to use to meet the energy need. In an example, the health value is based on a number of activations that each DER has experienced. The DER(s) with less activations will be chosen over DER(s) with more activations. The health value may be based on other characteristics of the DER such as DER age, operating efficiency, current capacity compared to the capacity when the DER was new (e.g., manufacturing date, installation date), etc.

The dispatch optimization system may assign the economic costs or the storage costs a higher priority. For example, if the economic costs have a higher priority, the dispatch optimization system determines a first subgroup of the fleet of energy resources to use based on the economic costs of the distributed energy resources. The dispatch optimization system selects the distributed energy resources that are the cheapest to use first. If the selected distributed energy resources are sufficient to meet the energy need, the dispatch optimization system will not compare the storage costs of the distributed energy resources. Otherwise, once the first subgroup is determined, the dispatch optimization system selects a second subgroup of distributed energy resources based on the storage costs of the remaining distributed energy resources.

In an example, only the distributed energy resources that are not in the first subgroup and that have an economic cost within a threshold value are considered. For example, the first subgroup may have an economic cost of thirteen cents per kilowatt hour (kWh) and lower. Of the remaining distributed energy resources, only distributed energy resources having an economic cost below 15 cents per kWh may be considered when the dispatch optimization system selects the second subgroup of distributed energy resources based on storage cost. The threshold may be determined based on the remaining number of distributed energy resources needed to meet the energy need with the first subgroup of distributed energy resources.

The dispatch optimization system may alternatively assign the storage costs a higher priority than the economic costs. The first subgroup described above would be determined by comparing the storage costs of each distributed energy resource. The second subgroup described above would be determined by comparing the economic costs of each distributed energy resource.

Once the dispatch optimization system determines which distributed energy resources to use, the dispatch optimization system can directly instruct the selected distributed energy resources to make energy adjustments to meet the energy need. Alternatively, the dispatch optimization system can instruct the virtual power plant to cause the selected distributed energy resources to make energy adjustments to meet the energy need.

FIG. 1 is a flow chart illustrating an example method 100 of controlling a fleet of distributed energy resources to meet an energy need. Method 100 begins at operation 102, and an energy need is determined. For example, a dispatch optimization system and/or virtual power plant may monitor a power distribution system to determine an energy need. The energy need may be a need for energy generation or energy consumption. For example, there may be an insufficient amount of energy produced for the current level of consumption on the power distribution system and/or will require costly start-up procedure of a power plant, resulting in an energy need of generation. In another example, there may be an excess amount of energy being produced that is straining the grid and/or will require costly shut down procedure of a power plant, resulting in an energy need of consumption to consume or otherwise reduce the excess energy.

Once the energy need is determined, a first subgroup of a fleet of distributed energy resources is determined to be used to meet the energy need based on an economic cost to use each distributed energy resource to meet a portion of the need at operation 104. For example, the first subgroup of distributed energy resources may include all distributed energy resources that have an economic cost of ten cents per kWh or less. In an example, the dispatch optimization system may determine which distributed energy resources to include in the first subgroup by comparing the economic costs of each distributed energy resource to determine a cut off value (e.g., ten cents per kWh).

The dispatch optimization system may exclude from the first subgroup any distributed energy resources having economic costs within a range that indicates the difference between economic costs may be outweighed by the differences in storage costs. The range can be a predetermined value or a dynamic value that changes based on factors of the power distribution system. For example, there may be a group of distributed energy resources that have economic costs of either 9.1 cents per kWh, 9.2 cents per kWh, or 9.3 cents per kWh, and the threshold range may be set to economics costs within 0.5 cents per kWh for example. Because the economic costs to use any of the group of distributed energy resources are within the range, the dispatch optimization system may not include the group of distributed energy resources in the first subgroup. The dispatch optimization system may wait to compare the storage costs of the group of distributed energy resources in operation 106 and place one or more of the distributed energy resources in a second subgroup to be used to meet the energy need.

Next, a second subgroup of distributed energy resources is determined based on a storage cost to use each distributed energy resource to meet the energy need in operation 106. The storage cost is a deviation from the ideal storage level for each distributed energy resource. In an example, a dispatch optimization system may determine which distributed energy resource to include in the second subgroup based on the storage costs. As used herein, a storage cost is equivalent to a difference in a storage cost value if the DER is used to meet the energy need and a current storage cost value. For example, the dispatch optimization system may determine the difference between the storage cost for each DER to reach its ideal storage level if it is used to meet the energy need and the current storage cost for each DER to reach its ideal storage level. If the DER's storage level will move away from the ideal storage level if used, the difference will be a positive value. If the DER's storage level will move toward the ideal storage level if used, the difference will be a negative value. Therefore, the DERs having negative values are preferred over DERs with positive values. Calculating the storage cost for each DER will be explained in further detail herein with reference to FIG. 8.

The dispatch optimization system may determine which distributed energy resources to use based on storage cost in order based on the distributed energy resources that have the lowest economic cost that are not included in the first subgroup. For example, if the distributed energy resources in the first subgroup all have an economic cost of ten cents per kWh or less, the dispatch optimization system will evaluate the distributed energy resources having an economic cost of 10.1 cents per kWh first, then 10.2 cents and so on. The dispatch optimization system will then select the distributed energy resources having a combination of the relative lowest storage costs and economic costs to include in the second subgroup.

Distributed energy resources that will move closer to its ideal storage level have a negative or minimum value storage cost, which is preferred when evaluating DERs based on storage cost. For example, a distributed energy resource having an ideal storage level of eighty percent of its capacity and will move from a storage level of fifty percent to forty percent if used will have a positive storage cost, while a distributed energy resource having an ideal storage level of eighty percent of its capacity and will move from a storage level of thirty percent to forty percent if used will have a negative or minimum value storage cost. The distributed energy resource with a negative storage cost would be chosen so the resulting storage level for both distributed energy resources is closer to the ideal storage level.

Finally, in operation 108, the first and second subgroups of distributed energy resources are caused to make energy adjustments to meet the energy need. For example, a dispatch optimization system and/or a virtual power plant may cause or instruct the first and second subgroups to make energy adjustments to meet the energy need. For example, the total energy need may be an additional 50 kWh, or an energy generation need. The first and second subgroups will discharge a total of 50 kWh. For example, there may be three distributed energy resources in each subgroup. The distributed energy resources may discharge 3 kWh, 5 kWh, 7 kWh, 8 kWh, 12 kWh, and 15 kWh respectively to meet the energy need. The distributed energy resources typically have different properties such as storage capacity, rate of discharge, rate of charge, current storage level, and ideal storage level.

Each distributed energy resource may discharge a different amount of energy base on the properties. For example, each distributed energy resource may discharge energy to make each distributed energy resource as close to its ideal storage level as possible. In another example, the distributed energy resources having the fastest rate of discharge will discharge more energy, so the energy need is met as quickly as possible. The dispatch optimization system can determine the amount of energy each distributed energy resource will discharge and/or consume based on one or more properties of the distributed energy resources.

In an example, some distributed energy resources may discharge energy and some distributed energy resources may consume energy. By having specific distributed energy resources discharge or consume energy, more distributed energy resources' storage levels may move closer to the ideal storage level for each distributed energy resource. For example, the dispatch optimization system may determine that the increased total economic cost to discharge certain distributed energy resources and charge others is worth making more distributed energy resources have an ideal or closer to ideal storage level.

Figure 2:
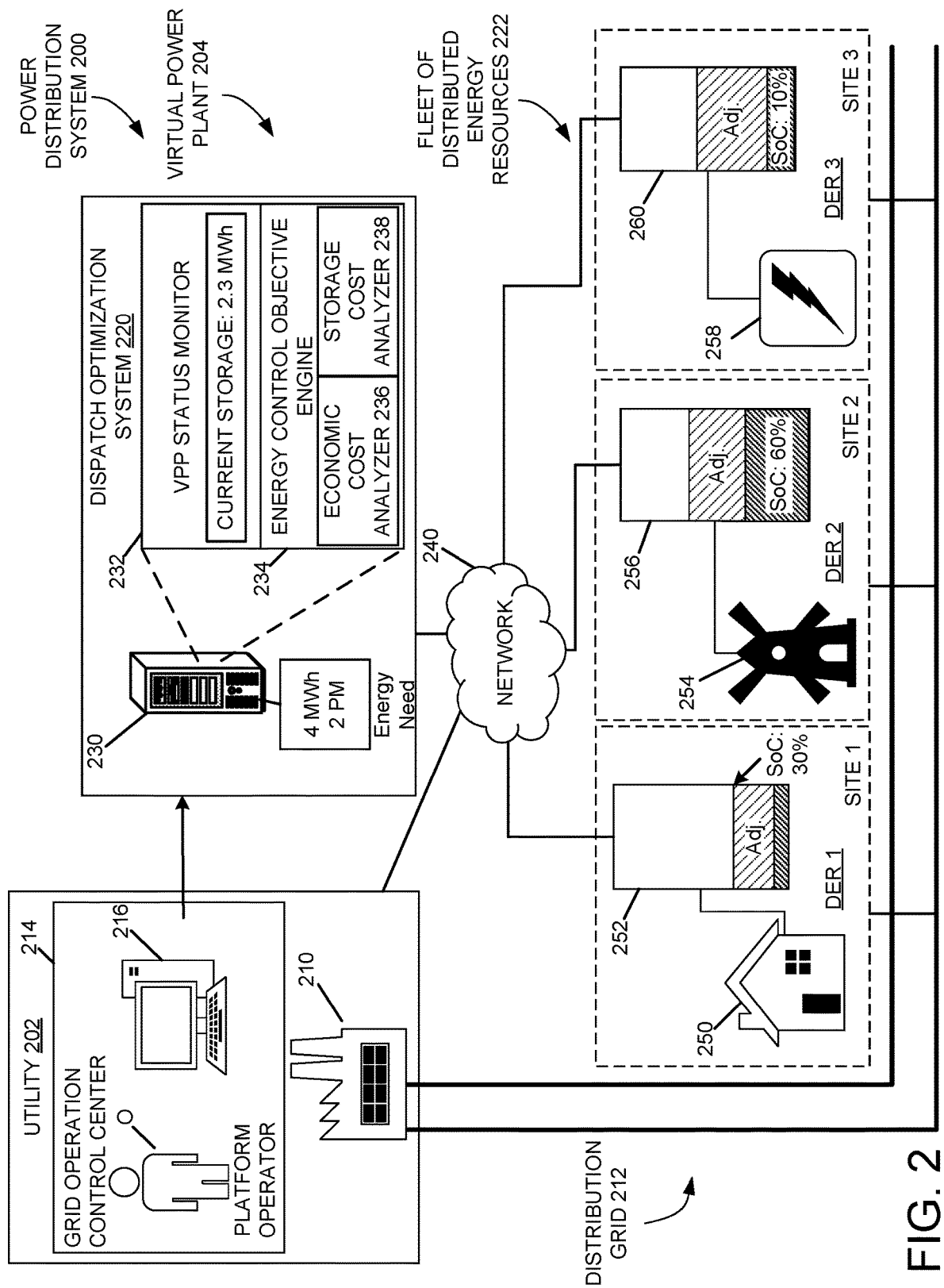
FIG. 2 is a schematic block diagram illustrating an example power distribution system.

FIG. 2 is a schematic block diagram illustrating an example power distribution system 200. In this example, the power distribution system 200 includes an electric utility 202 and a virtual power plant 204. The example electric utility 202 includes a power plant 210, a distribution grid 212, and a grid operation control center 214 having a utility computing device 216 operated by a platform operator O. The example virtual power plant 204 includes a dispatch optimization system 220, and a fleet of distributed energy resources 222 across a plurality of sites. In the illustrated example, site 1 includes DER 1, site 2 includes DER 2, and site 3 includes DER 3. The example dispatch optimization system 220 includes a computing device 230, a VPP status monitor 232, and an energy control objective engine 234. The energy control objective engine 234 includes economic cost analyzer 236 and storage cost analyzer 238. Portions of the power distribution system 200 can communicate across a data communication network 240.

A reliable power distribution system 200 is critical for modern societies, which rely on the power distribution system 200 to supply a consistent source of electricity for an endless variety of electrical needs. Several examples of systems that utilize electrical power include refrigeration systems, lighting, heating and air conditioning systems, computers and portable electronics, and electric motors.

An electric utility 202 is one possible source of electrical power, and traditionally has been the primary source. A power plant 210 generates electricity and distributes the energy across the distribution grid 212. The distribution grid 212 can include many different components, but at its core, the distribution grid 212 includes transmission lines that conduct electricity from the power plant 210 to the consumer sites.

In the illustrated example, the utility 202 also includes the grid operation control center 214, including a platform operator O, that is tasked with monitoring and controlling the grid operations in an effort to maintain a stable and reliable supply of electricity on the distribution grid 212. However, the virtual power plant 204 and/or the dispatch optimization system 220 may autonomously monitor and control the gird operations.

The grid operation control center 214 can utilize a variety of tools to not only monitor the real-time status of the distribution grid 212, but also to forecast both supply and demand in the future. For example, the grid operation control center 214 may have one or more computerized models that take as inputs current operating conditions as well as various other data, such as weather forecasts, in order to make predictions about consumer demand in the future. By comparing the power plant 210 production capabilities and the predicted demand, the grid operation control center 214 can try to identify possible problems before they occur, in an effort to avoid power outages, voltage drops, or frequency variations.

As one example, one of the biggest consumers of electrical energy is air conditioning systems. On a particularly hot day, the utility 202 can see a significant increase in peak demand due to the simultaneous operation of numerous home and commercial air conditioning systems. Therefore, if the utility 202 is not prepared or is not able to supply sufficient electrical energy at a time of peak demand, the utility 202 may need to shut down portions of the grid or start up backup power generators in order to maintain adequate quality on the rest of the grid.

But it is not only meeting peak demand that the grid operation control center 214 must worry about. The growth of renewable energy sources (solar, wind, and the like) also presents challenges to the utility 202. Solar and wind generators provide variable amounts of energy depending on the conditions. During a clear bright day, a solar generator can supply maximum energy to the grid, but cloud cover or dark of night reduce or eliminate solar production. Similarly, wind speeds can vary the amount of production from wind generators. Therefore, utilities connected to substantial renewable energy sources may also have the opposite problem of having too much energy at times of peak production. Additionally, it can be costly to power down a power generator such as a power plant at times of excess energy production, so it can be advantageous to consume the excess power rather than power down one or more generators.

One of the advantages of the power distribution system 200 including the virtual power plant 204 is that the virtual power plant 204 can help to support the operations of the utility 202. It can do this by supplying additional power to the grid during times of peak consumption and can also do this by drawing excess power from the grid during times of peak production.

The example virtual power plant 204 shown in FIG. 2 includes an example dispatch optimization system 220, and a fleet of distributed energy resources 222.

The distributed energy resources can include a variety of resources including electrical generators (e.g., distributed generation systems) and storage systems (e.g., distributed energy storage systems). Examples of electrical generators include renewable energy sources, such as solar power (e.g., photovoltaics), wind power, geothermal power, small hydro, biomass, biogas, and the like. Examples of storage systems include battery, pumped hydro, compressed air, and thermal energy storage systems.

In the illustrated example, the virtual power plant 204 includes DERs that are distributed across a plurality of sites. Each site can have one or more DERs. For example, site 1 includes DER 1, site 2 includes DER 2, and site 3 includes DER 3. An example of the DER 1 is a solar generator 250 and a first battery storage system 252. An example of the DER 2 is a wind power generator 254 and a second battery storage system 256. An example of the DER 3 is a gas generator 258 and a third battery storage system 260. DERs do not have to include a battery storage system, but each of the examples shown in FIG. 2 includes a similar battery storage system for ease of explanation.

The dispatch optimization system 220 provides centralized control of the fleet of distributed energy resources of the virtual power plant 204. In this example, the dispatch optimization system 220 includes the computing device 230, which operates the VPP status monitor 232, and the energy control objective engine 234. The VPP status monitor 232 monitors the status and operation of the fleet of DERs 222. For example, the dispatch optimization system 220 can determine that an energy need exists via the VPP status monitor. In some examples, the VPP status monitor 232 maintains a virtual model of the fleet of DERs 222, as illustrated and described in more detail herein with reference to FIG. 3.

The energy control objective engine 234 includes an economic cost analyzer 236 and a storage cost analyzer 238. The economic cost analyzer 236 can analyze the fleet of DERs to select a subgroup of DERs to be used to meet an existing energy need based on the economic cost to use each DER in the fleet. The storage cost analyzer 238 can analyze the fleet of DERs to select a subgroup of DERs to be used to meet an existing energy need based on the storage cost to use each DER in the fleet.

Portions of the power distribution system 200, such as the computing devices described herein, and the distributed energy resources, can communicate with one another across a data communication network 240. The data communication network 240 can include one or more data communication networks, such as the Internet, cellular data communication networks, local area networks, and the like.

Figure 3:
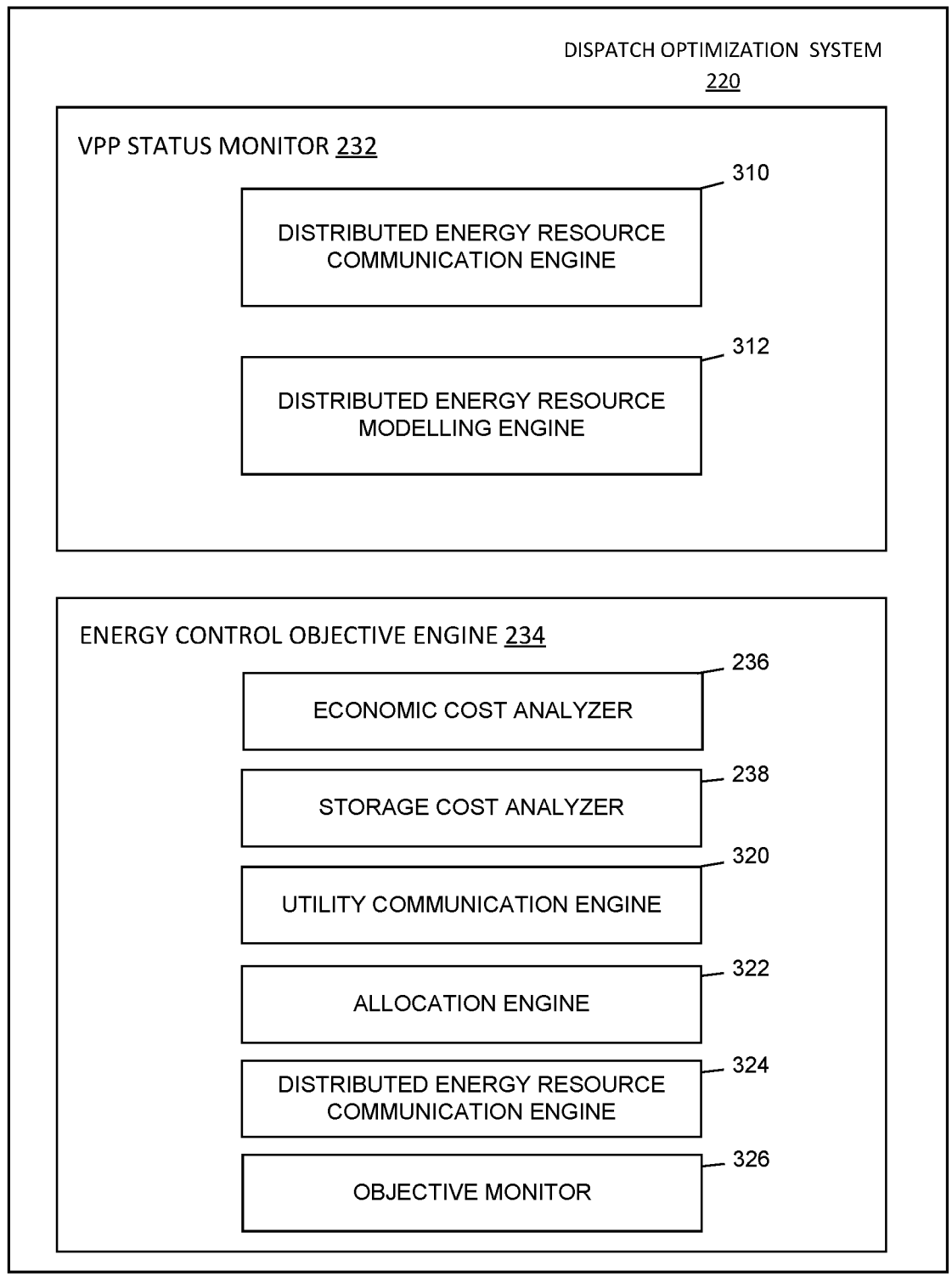
FIG. 3 is schematic block diagram illustrating an example of the dispatch optimization system shown in FIG. 2.

FIG. 3 is a schematic block diagram illustrating an example of the dispatch optimization system 220, shown in FIG. 2. In this example, the VPP status monitor 232 includes a distributed energy resource communication engine 310 and a distributed energy resource modelling engine 312. The energy control objective engine 234 of FIG. 2 includes an economic cost analyzer 236, a storage cost analyzer 238, a utility communication engine 320, allocation engine 322, distributed energy resource communication engine 324, and an objective monitor 326.

As explained above with reference to FIG. 2, the VPP status monitor 232 monitors the status and operation of the fleet of DERs 222 in FIG. 2. The VPP status monitor 232 utilizes the distributed energy resource communication engine 310 to receive and monitor the status and operation of the fleet of DERs 222. The distributed energy resource communication engine 310 can receive information about each distributed energy resource in the fleet of DERs 222 such as the current storage level, storage capacity, rate of charge, rate of discharge, the economic cost DER, and the storage cost to use the DER. The economic cost may be produced by the economic cost analyzer 236, and the storage cost may be produced by the storage cost analyzer 238.

The distributed energy resource modelling engine 312 creates and maintains a virtual model of the fleet. For example, it can create a virtual model of the distributed energy resources in the fleet of DERs 222 in FIG. 2, as illustrated and described in more detail herein with reference to FIG. 4. The model can contain any desired information about the distributed energy resources in the fleet, including the current storage level, storage capacity, rate of charge, rate of discharge, the economic cost, and the storage cost. The distributed energy resource modelling engine 312 can communicate with the energy control objective engine 234 to receive information about the distributed energy resources, including the economic cost and storage cost to use each DER to meet an energy need.

As explained above with reference to FIG. 2, the energy control objective engine 234 can determine the necessary adjustment needed to reach the energy target. The utility communication engine 320 enables the energy control objective engine 234 to communicate with a utility, such as utility 202 in FIG. 2. The utility communication engine 320 can receive instructions from the utility which includes determining a group of DERs to use to meet an energy need.

The allocation engine 322 enables the energy control objective engine 234 to determine subgroups of DERs and allocate energy adjustments to the subgroups of DERs to meet an energy need. For example, the allocation engine 322 can determine a subgroup of DERs and allocate energy adjustments between the distributed energy resources in the fleet of DERs 222 in FIG. 2. The allocation engine 322, for instance, may select DER 1 and DER 2 to meet the energy need and determine that DER 1 should charge to ninety percent of its capacity and DER 2 should charge to sixty percent of its capacity to meet the energy need. The allocation engine 322 may select every distributed energy resource in the fleet or select a subgroup of the distributed energy resources. For example, the allocation engine selects a subgroup to use to meet the energy need based on the economic cost to use each DER. The economic cost may first be determined by economic cost analyzer 236 and sent to the allocation engine 322. The allocation may select another subgroup to use to meet the energy need based on the storage cost to use each DER. The storage cost may first be determined by storage cost analyzer 238 and sent to the allocation engine 322. Alternatively, the allocation engine may determine the subgroup of DERs to use based a combination of the economic cost and storage cost of each DER. The allocation engine 322 can determine a specific energy adjustment or a uniform energy adjustment for each DER in the selected subgroup(s) to meet the energy need.

The allocation engine 322 can communicate with the VPP status monitor 232 to obtain any information needed to allocate the energy adjustment. For example, the allocation engine 322 may receive the current storage level, storage capacity, rate of charge, and the rate of discharge for each distributed energy resource in the fleet. The allocation engine 322 can receive this information from the virtual model created by the distributed energy resource modelling engine 312. Alternatively, the allocation engine 322 can communicate with distributed energy resource communication engine 324 to receive the same information. This allows the energy control objective engine 234 to allocate the energy adjustment without communicating with the VPP status monitor 232.

The distributed energy resource communication engine 324 operates like the distributed energy resource communication engine 310 described above. The distributed energy resource communication engine 324 allows the energy control objective engine 234 to communicate with the fleet of distributed energy resources without communicating with the VPP status monitor 232.

The objective monitor 326 tracks the status of the energy adjustment and can monitor the fleet of distributed energy resources in real-time to ensure that the energy target will be met. The objective monitor can communicate with the distributed energy resource communication engine 324 or the VPP status monitor 232 to communicate with the fleet of distributed energy resources and receive information on the current energy adjustments made by the distributed energy resources. In some examples, the objective monitor 326 receives this information from the virtual model created by the distributed energy resource modelling engine 312. The objective monitor 326 may indicate that the current allocation is insufficient to meet the energy need. The allocation engine 322 can then reallocate the energy adjustment for each selected distributed energy resource if necessary. The economic cost analyzer 236 can determine the economic cost to use each DER and the storage cost analyzer 238 can determine the storage cost to use each DER to remedy the insufficient allocation and meet the energy need. The allocation engine 322 may then determine a subgroup of DERs to use to meet the energy need based on the economic cost and/or the storage cost to use each DER. The distributed energy resource communication engine 324 can then instruct the distributed energy resources of the fleet to make energy adjustments according to the revised allocations. This will cause the fleet of distributed energy resource to meet the energy need.

Figure 4:
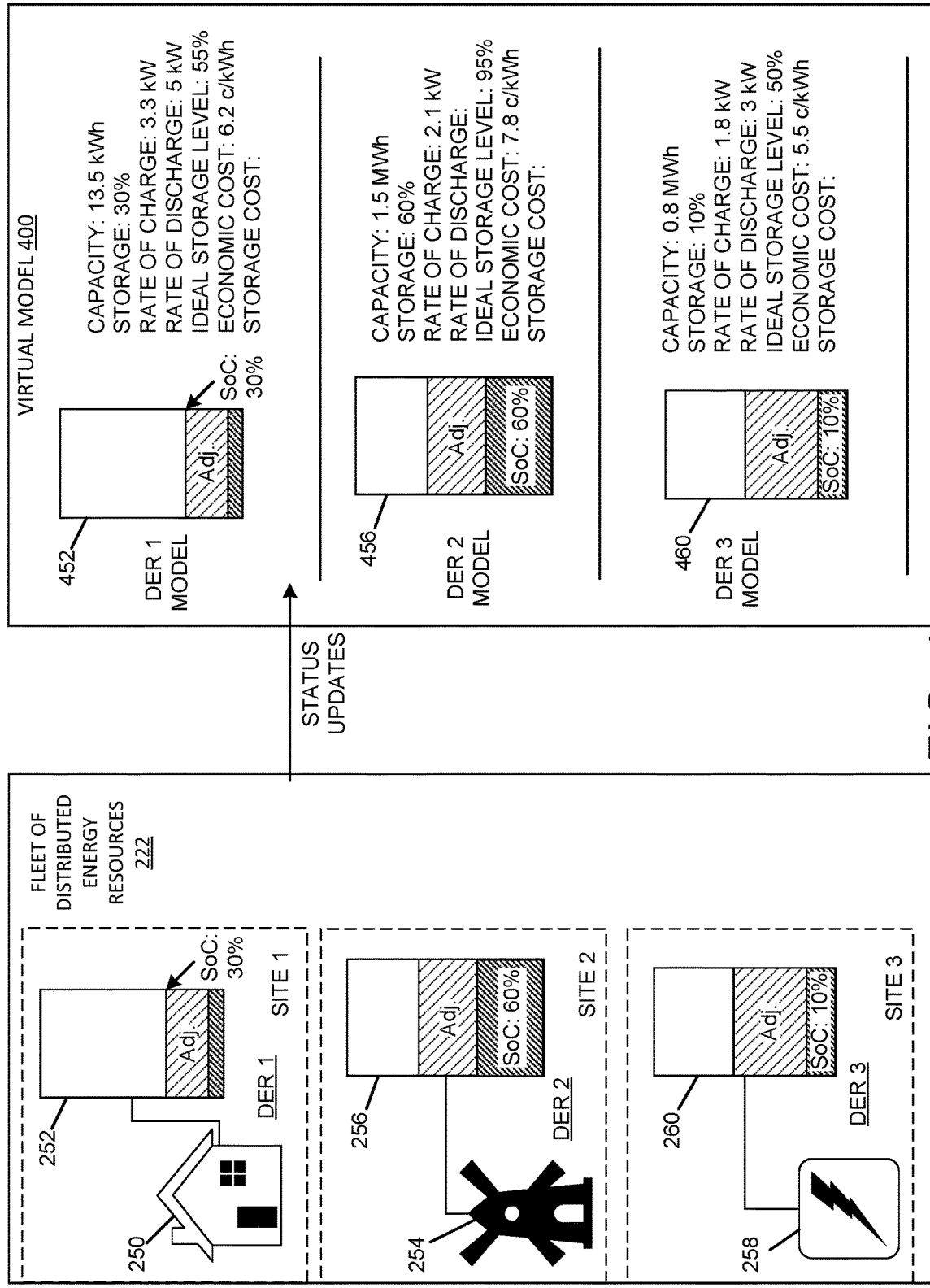
FIG. 4 is a schematic block diagram illustrating an example of the fleet of distributed energy resources, shown in FIG. 2, and corresponding virtual model of the fleet.

FIG. 4 is a schematic block diagram illustrating an example of the fleet of distributed energy resources 222, shown in FIG. 2, and corresponding virtual model 400 of the fleet. In some examples the virtual model 400 is part of the VPP status monitor 232, shown in FIG. 2. The dispatch optimization system 220 can create and/or update the virtual model 400. For example, the VPP status monitor 232 may include a distributed energy resource modelling engine 312 as shown in FIG. 3 to create and/or update the virtual model 400. In the illustrated example, the fleet of distributed energy resources 222 includes DER 1, DER 2, and DER 3 of FIG. 1. The first battery storage system model 452 is the virtual representation of the first battery storage system 252. The second battery storage system model 456 is the virtual representation of the second battery storage system 256. The third battery storage system model 460 is the virtual representation of the third battery storage system 260. In an example, the first battery storage system model 452, the second battery storage system model 456, and the third battery storage system model 460 model the entire distributed energy resource. The distributed energy resources may be modelled as battery storage system models to simplify the virtual model 400.

The virtual model 400 stores any information related to the fleet of distributed energy resources 222. This information can include DER properties such as capacity, current storage level, rate of charge, rate of discharge, the economic cost to use the DER, the ideal storage level, the storage cost to use the DER, and other operating points of each distributed energy resource. For example, the DER 1 model includes virtual battery storage system 352, a capacity of 13.5 kWh, a rate of charge of 3.3 kW, a rate of discharge of 5 kW, and an economic cost of 6.2 cents per kWh. In some examples, the information in the virtual model can be updated by communicating with the distributed energy resource communication engine 310, allocation engine 322, distributed energy resource communication engine 324, and objective monitor 326 as shown in FIG. 3.

The virtual model 400 can update in real-time to effectively model the current state of the fleet of distributed energy resources 222. For example, the distributed energy resource modelling engine 312 monitors and updates the virtual model 400 continuously. The virtual model 400 can be used to determine an energy need. For example, the energy control objective engine 234 may communicate with the distributed energy resource modelling engine 312 as shown in FIG. 3 to access the virtual model 400.

The virtual model 400 can also be provided to a utility, such as utility 202 in FIG. 2. The virtual model 400 can be leveraged to determine the existence of an energy need. For example, a utility can use the virtual model 400 to determine that an energy need exists and that discharging DER 1 and DER 2 have the lowest economic cost, storage cost, and/or a combination of economic and storage costs to provide energy to meet the energy need. The virtual model 400 can also be used to forecast the state of the power distribution system 200, including energy levels of the distributed energy levels at future times.

Figure 5:
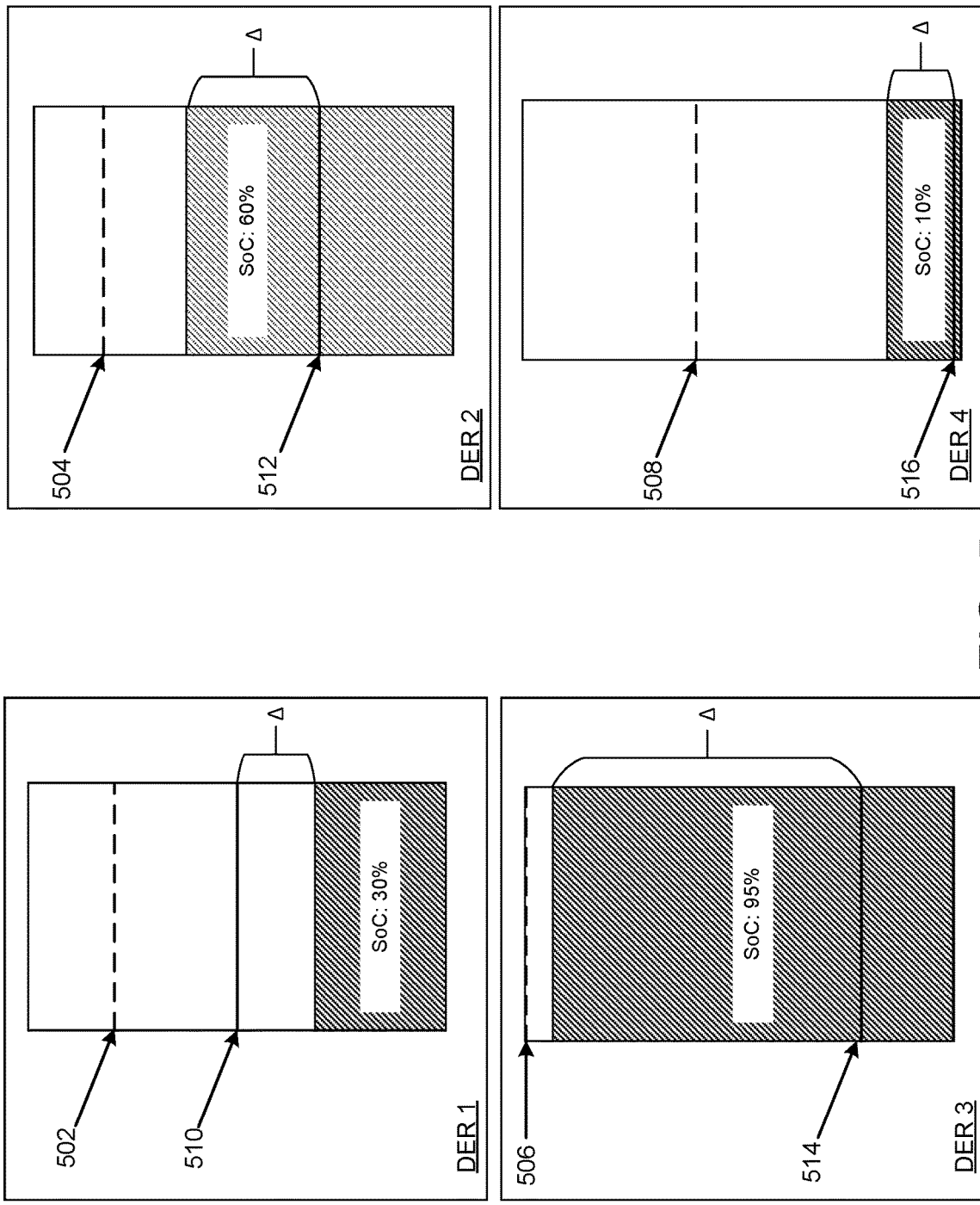
FIG. 5 is a schematic block diagram illustrating an example fleet of distributed energy resources modeled as virtual representations of battery systems.

FIG. 5 is a schematic block diagram illustrating an example fleet of distributed energy resources modeled as virtual representations of battery systems as shown in the virtual model 400 of FIG. 4. The modeled DERs all have a current storage level, a new storage level if the DER is used to meet an energy need, a change in storage level if the DER is used to meet the energy need, and an ideal storage level. For example, DER 1 has a current storage level of thirty percent, a new storage level 510, and an ideal storage level 502. DER 2 has a current storage level of sixty percent, a new storage level 512, and an ideal storage level 504. DER 3 has a current storage level of 95 percent, a new storage level 514, and an ideal storage level 506. DER 4 has a current storage level of ten percent, a new storage level 516, and an ideal storage level 508.

As described above, DER 1 has a negative or minimum value storage cost because the new storage level 510 is closer to the ideal storage level 502 than the current storage level. For example, if DER 1 is used to meet the energy need, the storage level will increase from thirty percent to new storage level 510. For example, new storage level 510 may be 45 percent storage level, closer to ideal storage level 502, which may be eighty percent.

DER 2, DER 3, and DER 4 have a positive storage cost if used to meet the energy need because new storage level 512 is further from the ideal storage level 504, new storage level 514 is further from the ideal storage level 506, and new storage level 516 is further from the ideal storage level 508 compared to the DERs current states of charge. DER 3 will experience a larger change than the other two DERs, so the storage cost is higher. As a result, DER 2 and DER 3 will typically be selected before DER 4 if the subgroup of DERs is being determined based on storage cost. DER 4 has the smallest change in storage level, so it may be selected before DER 2 is selected. Alternatively, DER 4 has a higher difference between the new storage level 516 and ideal storage level 508, so it may be selected after DER 2, which has a smaller difference between new storage level 512 and ideal storage level 504. For example, the storage cost analyzer 238 may determine the storage cost giving the magnitude of change a higher priority or the resulting difference in storage level a higher priority.

Figure 6:
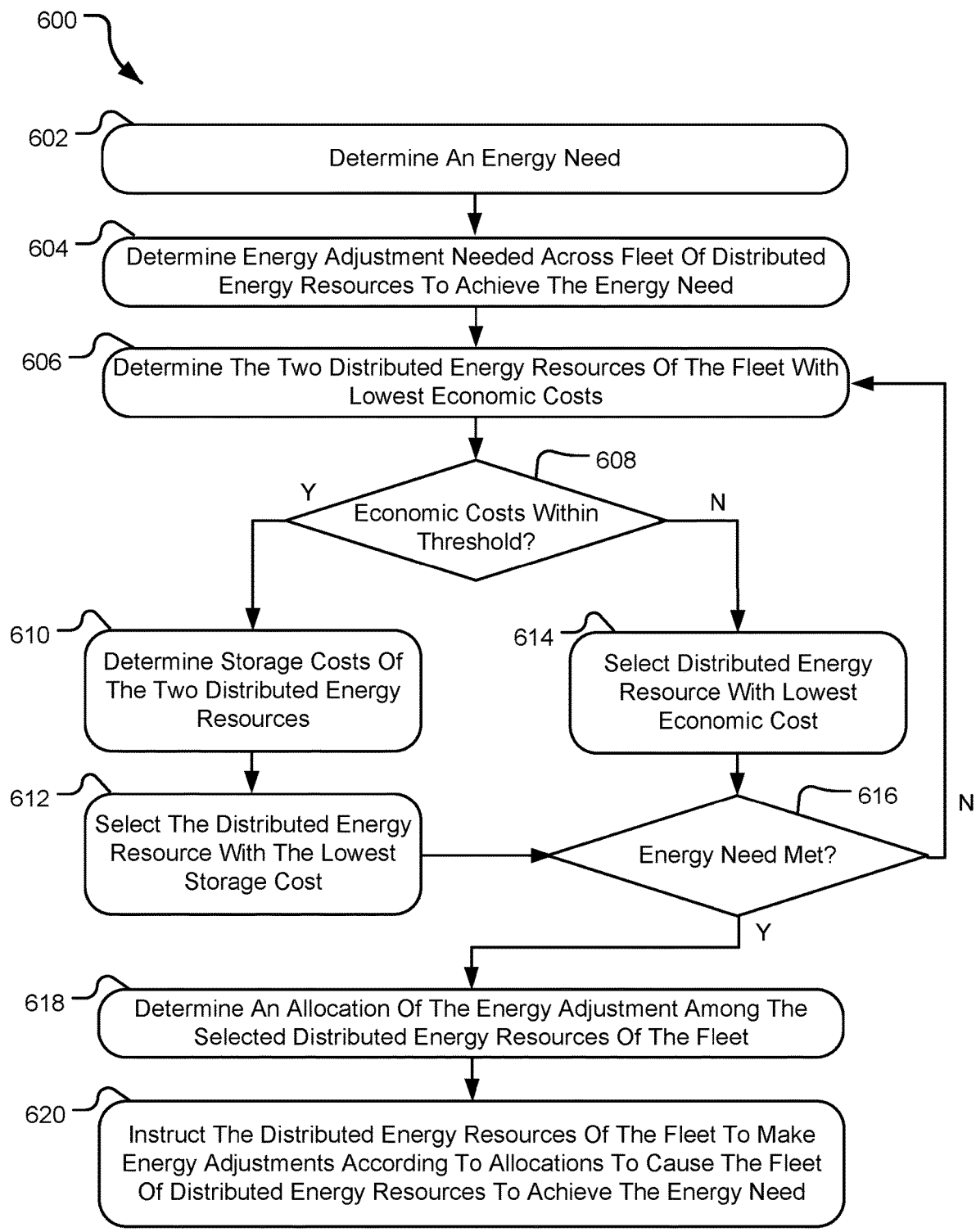
FIG. 6 is a flow chart illustrating an example method of controlling a fleet of distributed energy resources to meet an energy need.

FIG. 6 is a flow chart illustrating an example method 600 of controlling a fleet of distributed energy resources to meet an energy need. For example, the dispatch optimization system 220 may perform one or more operations of the method 600 to control a fleet of DERs to meet the energy need. The method 600 begins by determining an energy need in operation 602. For example, the VPP status monitor 232 or energy control objective engine 234 illustrated in FIG. 2 may monitor the power distribution system 200 to determine that there is an energy need.

An energy adjustment needed across a fleet of DERs to achieve the energy need is determined in operation 604. For example, the allocation engine 322 may determine an energy adjustment that is needed across the fleet of distributed energy resources 222 to meet the energy need.

Next, it is determined which two DERs of the fleet of DERs have the lowest economic costs in operation 606. For example, the economic cost analyzer 236 may determine the two DERs having the lowest economic cost to use to meet the energy need. In one example, more than two DERs may have the lowest economic cost, and more than two DERs may be selected in operation 606.

The DERs selected in operation in 608 have the economic costs of each DER compared to determine if the economic costs are within a threshold value. For example, the economic cost analyzer 236 and/or the allocation engine 322 may compare the economic costs to determine whether the economic costs are within a threshold value. The threshold value may be a predetermined value or a dynamic value. The threshold value can be set to make the selection of DERs primarily based on the economic cost or primarily based on different factors such as a storage cost. For example, the threshold value can be set to require the economic costs to be identical for flow to proceed to operation 610. In another example, the threshold value can be set to allow any value for economic costs, allowing the method 600 to always flow to operation 610. In another example, the threshold value is set in between the two threshold values described above so that there is a range of economic cost differences that will allow flow to proceed to operation 610.

If the economic cost of the DERs is within the threshold value, flow proceeds to operation 610. In operation 610, the storage costs to use each selected DER to meet the energy need is determined. For example, the storage cost analyzer 238 may determine the storage cost to use the two or more DERs that were selected in operation 606. The determination of the storage cost to use the DERs is described in more detail herein with respect to FIG. 8.

The DER with the lowest storage cost is then selected to be used to meet the energy need in operation 612. For example, the storage cost analyzer 238 and/or the allocation engine 322 selects the DER with the lowest storage cost to be used to meet the energy need. In some examples, the DERs have identical storage costs. In these examples, the DER may be chosen based on a health value of each DER. For example, the health value may be based on a number of activations, the age, and/or the operating efficiency of each DER.

Moving back to operation 608, if the economic costs are not within the threshold, flow proceeds to operation 614. In operation 614, the DER with the lowest economic cost is selected. For example, the economic cost analyzer 236 and/or the allocation engine 322 selects the DER with the lowest economic cost to be used to meet the energy need. In some examples, the DERs have identical economic costs. In these examples, the DER may be chosen based on a health value of each DER.

Flow proceeds from operations 612 and 614 to operation 616. In operation 616, it is determined whether the energy need will be met by the currently selected DER(s). For example, the allocation engine 322 will determine whether the DERs selected in operations 612 and 614 will meet the energy need.

If the energy need will not be met, flow proceeds back to 606 so one or more DERs can also be selected to meet the energy need.

If the energy need will be met, flow proceeds to operation 618, and an allocation of the energy adjustment among the selected DERs is determined. For example, the allocation engine 322 may determine an energy allocation for each DER to meet the energy need. The energy allocation for each DER may be specific to each DER or uniform.

In operation 620, the DERs are then instructed to make the energy adjustments according to the allocations determined in operation 618 to cause the energy need to be met.

For example, the allocation engine 322 may cause the selected DERs to make energy adjustments according to the determined allocations via the distributed energy resource communication engine 324.

Figure 7:
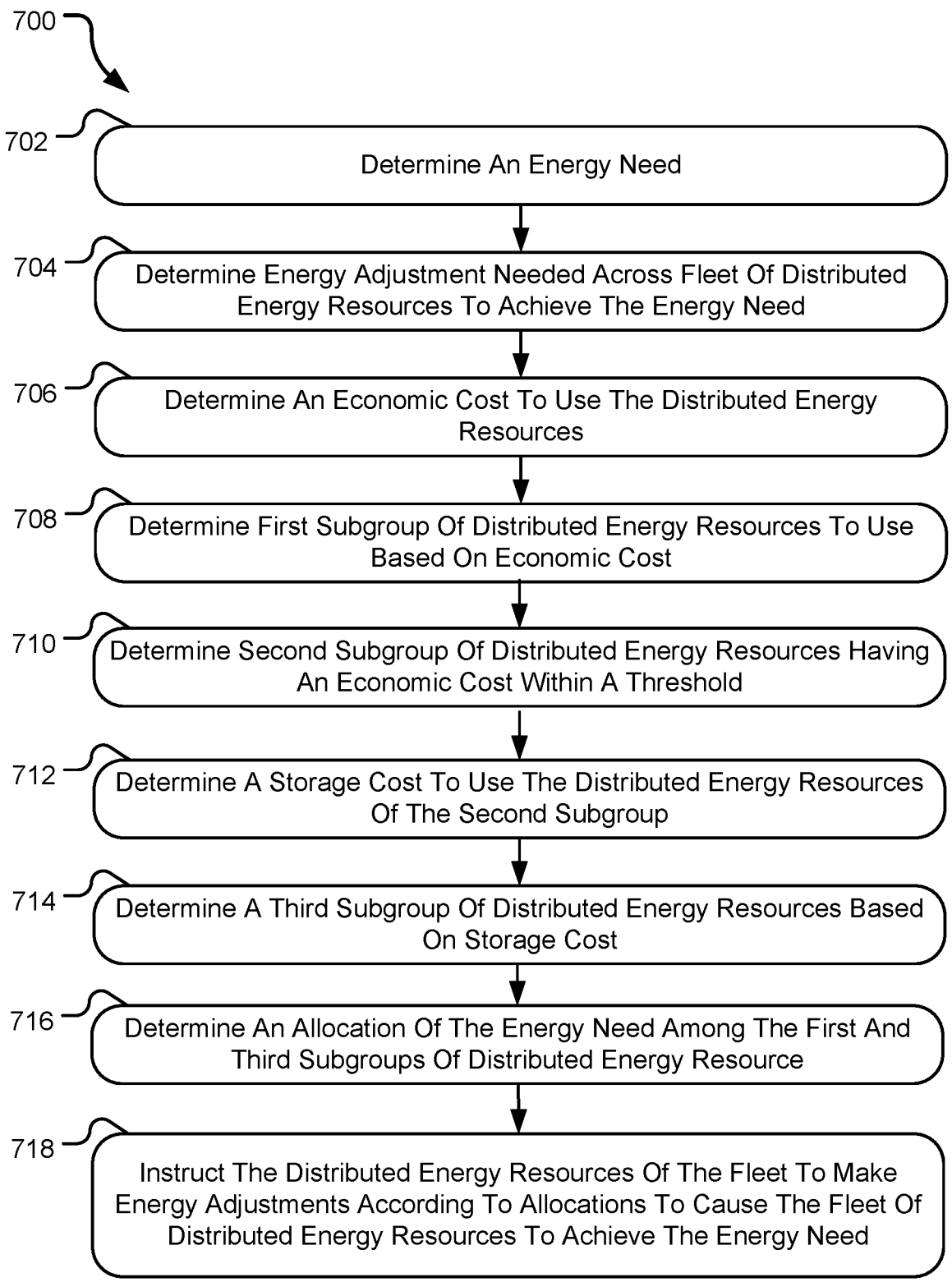
FIG. 7 is a flow chart illustrating an example method of controlling a fleet of distributed energy resources to meet an energy need.

FIG. 7 is a flow chart illustrating an example method 700 of controlling a fleet of distributed energy resources to meet an energy need. For example, the dispatch optimization system 220 may perform one or more operations of the method 700 to control a fleet of DERs to meet the energy need. The method 600 begins by determining an energy need in operation 702. For example, the VPP status monitor 232 or energy control objective engine 234 illustrated in FIG. 2 may monitor the power distribution system 200 to determine that there is an energy need.

An energy adjustment needed across a fleet of DERs to achieve the energy need is determined in operation 704. For example, the allocation engine 322 may determine an energy adjustment that is needed across the fleet of distributed energy resources 222 to meet the energy need.

Next, an economic cost to use each DER to meet the energy need is determined in operation 706. For example, the economic cost analyzer 236 may determine the economic cost to use each DER in the fleet of DERs.

The economic cost is then used to determine a first subgroup of a fleet of distributed energy resources to be used to meet the energy need at operation 708. For example, the first subgroup of distributed energy resources may include all distributed energy resources that have an economic cost of eight cents per kWh or less.

In operation 710, a second subgroup of DERs of the fleet of DERs is determined that have an economic cost within a threshold. For example, there may be multiple DERs having economic costs close to the cut off value of eight cents per kWh to be included in the first subgroup determined in operation 708. The threshold may be half a cent, so any DERs having economic costs of 8.1 cents to 8.6 cents will be included in the subgroup. In an example, the threshold is determined to ensure that there are enough DERs in the second subgroup to meet the total energy need with the first subgroup of DERs.

The storage costs for each DER of the second subgroup is determined in operation 712. For example, the storage cost analyzer 238 may determine the storage cost to use each DER in the second subgroup. The determination of the storage cost to use the DER is described in more detail herein with respect to FIG. 8.

A third subgroup of DERs is determined from the second subgroup of DERs based on the storage costs of each DER in the second subgroup in operation 714. For example the allocation engine 322 may determine the third subgroup of DERs based on the storage cost.

In operation 716, an allocation of the energy adjustment among the first and third subgroups of DERs is determined. For example, the allocation engine 322 may determine an energy allocation for each DER in the first and third subgroup to meet the energy need. The energy allocation for each DER may be specific to each DER or uniform. In an example, the allocation for each DER is based on the properties of each DER such as capacity, rate of charge, and rate of discharge.

Finally, the DERs in the first and third subgroups of DERs are instructed to make energy adjustments according to the determined allocation to achieve the energy need. For example the energy control objective engine 234 may instruct the first and third subgroups of DERs to make energy adjustments via the distributed energy resource communication engine 324.

Figure 8:
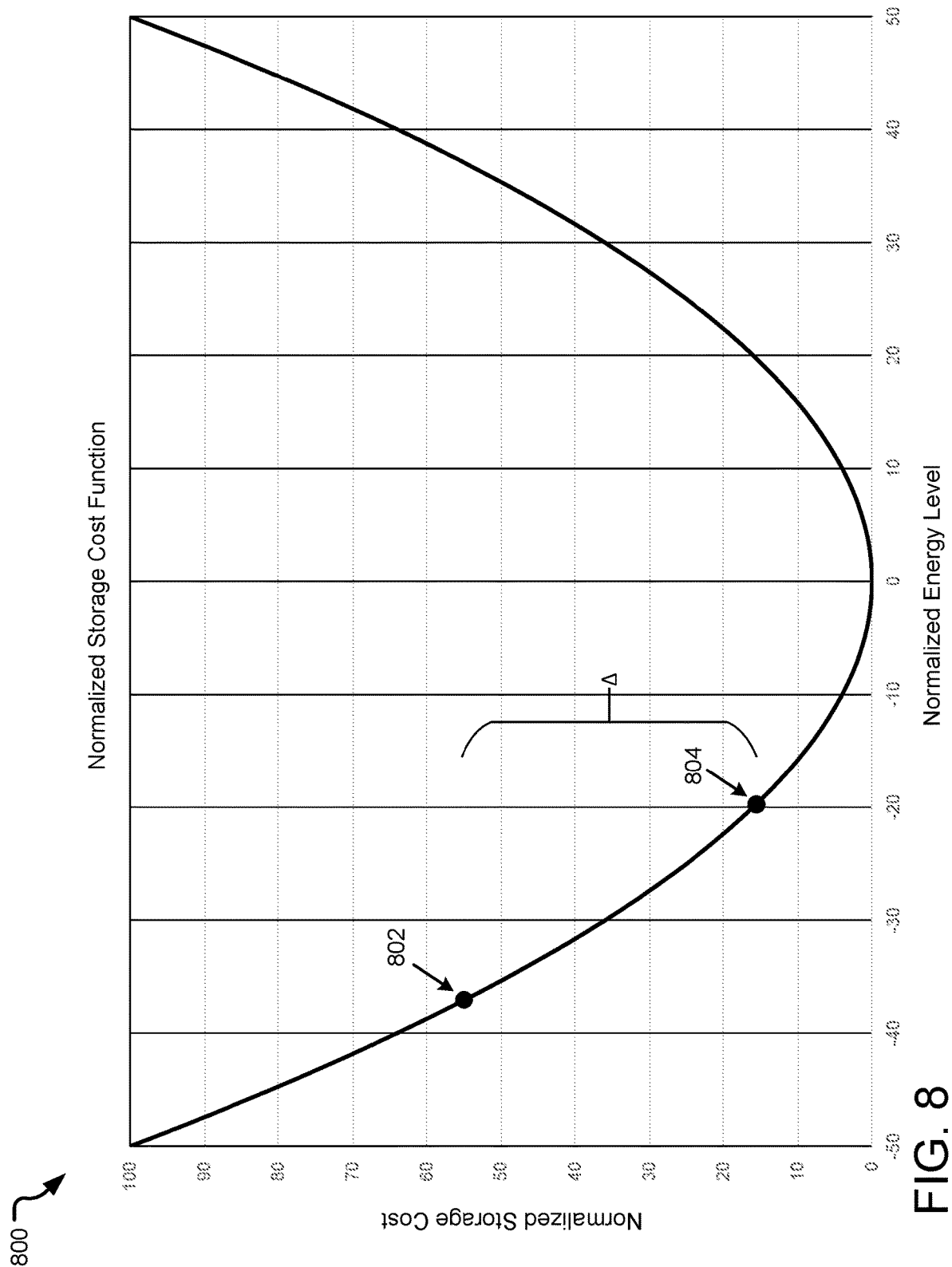
FIG. 8 is a graphical representation of an example storage cost function.

FIG. 8 is a graphical representation of an example storage cost function. The normalized storage cost function illustrated in FIG. 8 is an example function that may be used to determine the storage cost to use a DER to meet the energy need. For example, the storage cost analyzer 238 may use the storage cost function when evaluating DERs to determine the storage cost to use each DER.

The example storage cost function is defined as a second order polynomial where the x-axis is normalized storage level scaled to [−50,50] centered about the ideal storage level for the asset and the y-axis is normalized storage cost scaled to [0,100]. In this example, the ideal storage level for the DER is fifty percent storage level. The storage cost function can be altered to allow the storage cost analyzer 238 to use the function for any ideal storage level.

The storage cost analyzer 238 determines the starting position on the storage cost function based on the DER's current storage level versus the nominal energy. The normalization function may include constraints such as capacity, ideal storage level, operational storage level limits, and/or user or owner defined storage level limits. The constraints can be used to map the storage level energy values into the scale that is bounded from −50 to 50.

Once the starting position of the DER is determined, the storage cost analyzer 238 calculates the current storage cost by calling the storage cost function. The current storage cost is the storage cost for the DER to reach the ideal storage level from the current storage level. The example storage cost function is StorageCost(x)=0.04x$^2$, where the input x is the normalized current storage level. Storage cost 802 is the current storage cost in the illustrated example.

Once the current storage cost is determined, the storage cost analyzer 238 determines the final storage cost, or the storage cost if the DER is used to meet the energy need. For example, the storage cost analyzer 238 will use the resulting storage level with storage cost function to determine the storage cost if the DER is used. The resulting storage level can be determined by adding the requested energy associated with energy need to the DER's current storage level, normalizing the storage level on the x-axis, and using the function to calculate the storage cost. Storage cost 804 is the final storage cost in the illustrated example.

Next, the storage cost analyzer 238 calculates the change in storage cost by subtracting the current storage cost from the storage cost of the DER if it is used to meet the need. In the illustrated example, the change in storage cost is storage cost 804 minus storage cost 802, which is 15−55=−40. The negative value indicates that DER's storage level will be closer to the ideal storage level if the DER is used to meet the energy need. Therefore, the DER will be chosen to be used to meet the energy need over a DER having a change in storage cost value of −35, −12, 0, 13, 25, etc., when storage cost is being used to evaluate the DERs.

One or more aspects described herein can be implemented with a computing environment. A computing environment is a set of one or more virtual or physical computers that cause output based on input. Example computers include desktop computers, servers, mobile computing devices, wearable computing devices, virtualized computing devices, other computers, or combinations thereof. Many example computers include one or more processors, memory, and one or more interfaces.

The one or more processors are collections of one or more virtual or physical components that are configured to provide output in response to input. In many examples, the one or more processors are so configured by obtaining and executing instructions (e.g., stored in the memory) and using data (e.g., also stored in the memory). The one or more processors can take any of a variety of forms, such as central processing units, graphics processing units, coprocessors, tensor processing units, artificial intelligence accelerators, microcontrollers, microprocessors, other forms, or combinations thereof. In some examples, the one or more processors are so configured through specifically designed hardware. Examples of such processors include application-specific integrated circuits, field programmable gate arrays, other processors, or combinations thereof.

The memory is a collection of one or more virtual or physical components configured to store instructions or data for later retrieval and use. In many examples, the memory is a non-transitory computer readable medium, though in certain circumstances the memory can be transitory. Examples of transitory memory include data encoded into transient signals. Examples of non-transitory memory include random access memory, cache memory (e.g., which may be incorporated into the one or more processors), read only memory, optical memory, magnetic memory, solid state memory, other memory, or combinations thereof. In some examples, the memory can be configured to be portable, such as enclosed hard drives, thumb drives, CD-ROM disks, DVDs, BLU-RAY disks, other media, or combinations thereof. In some examples, the memory can be incorporated with the one or more processors (e.g., via registers or cache memory).

The one or more interfaces are one or more virtual or physical components by which the computing environment can receive input or provide output. Example interfaces for providing output include one or more visual output components (e.g., displays or lights), auditory output components (e.g., speakers), haptic output components (e.g., vibratory components), other output components, or combinations thereof. Example interfaces for receiving input include one or more visual input components (e.g., still cameras, video cameras, optical sensors), auditory input components (e.g., microphones), haptic input components (e.g., touch or vibration sensitive components), motion input components (e.g., mice, gesture input controllers, or movement sensors), buttons (e.g., keyboards or mouse buttons), position sensors, other input components, or combinations thereof. The one or more interfaces can include components for sending or receiving data from other computing environments or devices, such as one or more wired connections or wireless connections.

One or more of the one or more interfaces can facilitate connection of the computing environment to a network. The network can be a set of one or more other computing devices or environments. Example networks include local area networks, wide area networks, or the Internet.

The environment and its one or more physical computers can include any of a variety of other components to facilitate performance of operations described herein. Example components include one or more power units (e.g., batteries, capacitors, or power harvesters) that provide operational power, one or more busses to provide intra-device communication, one or more cases or housings to encase one or more components, other components, or combinations thereof.

In some instances, the computing device or the environment can be a general-purpose computing device or environment. They may be constructed from one or more consumer or off-the-shelf components. In some instances, via hardware or software configuration, the computing device or the environment can be a special purpose computing device.

The one or more computing devices or computing environments can individually or in cooperation to perform operations described herein.

A person of skill in the art, having benefit of this disclosure, may recognize various ways for implementing technology described herein. The person of skill in the art may use any of a variety of programming languages and libraries (e.g., libraries that provide functions for obtaining, processing, and presenting data). Operating systems may provide their own libraries or application programming interfaces useful for implementing aspects described herein. A person of skill in the art, with the benefit of the disclosure herein, can use programming tools to assist in the creation of software or hardware to achieve techniques described herein. Such tools can include intelligent code completion tools, artificial intelligence tools.

A person of skill in the art with the benefit of disclosures herein can use any of a variety of known techniques to implement aspects described herein.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

The following are additional clauses relative to the present disclosure, which can be combined and/or otherwise integrated with any of the embodiments described above, the clauses listed herein, and/or the claims listed below.

Clause 1. A method for optimizing the dispatch of energy, the method comprising:
   determining an energy need;
   determining a first subgroup of a fleet of distributed energy resources to use to meet the energy need based on an economic cost to use each distributed energy resource to meet a portion of the energy need;
   determining a second subgroup of the fleet of distributed energy resources to use to meet the energy need based on a storage cost to use each distributed energy resource to meet the portion of the energy need; and
   causing the first subgroup of the fleet of distributed energy resources and the second subgroup of the fleet of distributed energy resources to make energy adjustments to meet the energy need.

Clause 2. The method of Clause 1, wherein the first subgroup is determined by:
   ranking the distributed energy resources from a lowest economic cost to a highest economic cost; and
   selecting the distributed energy resources in order of the ranking starting from the lowest economic cost.

Clause 3. The method of Clause 1, wherein the second subgroup is determined by:
   ranking the distributed energy resources from a lowest storage cost to a highest storage cost; and
   selecting the distributed energy resources in order of the ranking starting from the lowest storage cost.

Clause 4. The method of Clause 1, wherein determining the first subgroup of the fleet of distributed energy resources is further based on a health value of each distributed energy resource.

Clause 5. The method of Clause 4, wherein determining the first subgroup comprises:
   determining the economic costs of a group of distributed energy resources of the fleet of distributed energy resources are within a range; and
   selecting distributed energy resources from the group to include in the first subgroup based on the health value of each distributed energy resource of the group.

Clause 6. The method of Clause 1, wherein determining the second subgroup of the fleet of distributed energy resources is based on a health value of each distributed energy resource.

Clause 7. The method of Clause 6, wherein determining the second subgroup comprises:
   determining the storage costs of a group of distributed energy resources of the fleet of distributed energy resources are within a range; and
   selecting distributed energy resources from the group to include in the first subgroup based on the health value of each distributed energy resource of the group.

Clause 8. The method of Clause 1, wherein the storage cost comprises a difference between a final storage cost and a current storage cost of the distributed energy resource.

Clause 9. The method of Clause 8, wherein the current storage cost is a level of deviation from an ideal storage level and a current storage level of the distributed energy resource.

Clause 10. The method of Clause 8, wherein the final storage cost is a level of deviation from an ideal storage level and a final storage level when the distributed energy resource is used to meet the portion of the energy need.

Clause 11. The method of Clause 8, wherein determining the second subgroup comprises:
 ranking the distributed energy resources from a lowest storage cost to a highest storage cost; and
 selecting the distributed energy resources in order of the ranking from the lowest storage cost until the first subgroup and the second subgroup of distributed energy resources are sufficient to meet the energy need.

Clause 12. A dispatch optimization system comprising at least one processing device and at least one non-transitory computer-readable medium storing data instructions which, when executed by the at least one processing device, cause the dispatch optimization system to:
 determine an energy need;
 determine a first subgroup of a fleet of distributed energy resources to use to meet the energy need based on an economic cost to use each distributed energy resource to meet a portion of the energy need;
 determine a second subgroup of the fleet of distributed energy resources to use to meet the energy need based on a storage cost to use each distributed energy resource to meet the portion of the energy need; and
 cause the first subgroup of the fleet of distributed energy resources and the second subgroup of the fleet of distributed energy resources to make energy adjustments to meet the energy need.

Clause 13. The dispatch optimization system of Clause 12, wherein to determine the first subgroup comprises to:
 rank the distributed energy resources from a lowest economic cost to a highest economic cost; and
 select the distributed energy resources in order of the ranking starting from the lowest economic cost.

Clause 14. The dispatch optimization system of Clause 12, wherein to determine the second subgroup comprises to:
 rank the distributed energy resources from a lowest storage cost to a highest storage cost; and
 select the distributed energy resources in order of the ranking starting from the lowest storage cost.

Clause 15. The dispatch optimization system of Clause 12, wherein to determine the first subgroup of the fleet of distributed energy resources is further based on a health value of each distributed energy resource.

Clause 16. The dispatch optimization system of Clause 15, wherein to determine the first subgroup comprises to:
 determine the economic costs of a group of distributed energy resources of the fleet of distributed energy resources are within a range; and
 select distributed energy resources from the group to include in the first subgroup based on the health value of each distributed energy resource of the group.

Clause 17. The dispatch optimization system of Clause 12, wherein to determine the second subgroup of the fleet of distributed energy resources is based on a health value of each distributed energy resource.

Clause 18. The dispatch optimization system of Clause 17, wherein to determining the second subgroup comprises to:
 determine the storage costs of a group of distributed energy resources of the fleet of distributed energy resources are within a range; and
 select distributed energy resources from the group to include in the first subgroup based on the health value of each distributed energy resource of the group.

Clause 19. The dispatch optimization system of Clause 12, wherein the storage cost comprises a difference between a final storage cost and a current storage cost of the distributed energy resource.

Clause 20. A non-transitory computer-readable medium that stores a set of instructions which when executed perform a method executed by the set of instructions comprising:
 determining an energy need;
 determining a first subgroup of a fleet of distributed energy resources to use to meet the energy need based on an economic cost to use each distributed energy resource to meet a portion of the energy need;
 determining a second subgroup of the fleet of distributed energy resources to use to meet the energy need based on a storage cost to use each distributed energy resource to meet the portion of the energy need; and
 causing the first subgroup of the fleet of distributed energy resources and the second subgroup of the fleet of distributed energy resources to make energy adjustments to meet the energy need.

Clause 21. A dispatch optimization system comprising at least one processing device and at least one non-transitory computer-readable medium storing data instructions that, when executed by the at least one processing device, cause the dispatch optimization system to:
 determine an energy need;
 select a first distributed energy resource in a fleet of distributed energy resources to meet at least a portion of the energy need, selecting the first distributed energy resource including to:
  determine a first economic cost to use the first distributed energy resource to dispatch energy to meet at least the portion of the energy need;
  determine a second economic cost to use a second distributed energy resource to dispatch energy to meet at least the portion of the energy need;
  determine the first economic cost and the second economic cost are within a range;
  determine a first storage cost to use the first distributed energy resource to dispatch energy to meet at least the portion of the energy need, the first storage cost comprising a level of deviation from an ideal storage level of the first distributed energy resource;
  determine a second storage cost to use the second distributed energy resource to dispatch energy to meet at least the portion of the energy need, the second storage cost comprising the level of deviation from the ideal storage level of the second distributed energy resource; and
  determine the first storage cost is less than the second storage cost; and instruct the first distributed energy resource to make an energy adjustment to meet the at least the portion of the energy need.

Clause 22. The dispatch optimization system of Clause 21, wherein selecting the first distributed energy resource further comprises:
 receiving a first distributed energy resource health value associated with the first distributed energy resource; and receiving a second distributed energy resource health value associated with the second distributed energy resource.

Clause 23. The dispatch optimization system of Clause 22, wherein:
the first distributed energy resource health value comprises a number of activations of the first distributed energy resource; and
the second distributed energy resource health value comprises the number of activations of the second distributed energy resource.

Clause 24. A method for optimizing the dispatch of energy, the method comprising:
determining an energy need;
determining an energy adjustment needed across a fleet of distributed energy resources to meet the energy need;
determining an allocation of the energy adjustment among the fleet of distributed energy resources, determining the allocation comprising:
  determining an economic cost to use each distributed energy resource of the fleet of distributed energy resources to dispatch energy to meet the allocation of the energy adjustment;
  determining a first subgroup of the fleet of distributed energy resources to use to meet the energy need based on the economic cost to use each distributed energy resource;
  determining a second subgroup of distributed energy resources distinct from the first subgroup having economic costs within a threshold;
  determining a current storage level of each distributed energy resource in the second subgroup;
  determining an ideal storage level of each distributed energy resource in the second subgroup;
  determining a final storage level of each distributed energy resource in the second subgroup, the final storage level being the storage level of the distributed energy resource if it is used to dispatch energy to meet the allocation of the energy adjustment;
  determining a current deviation for each distributed energy resource of the second subgroup, the current deviation being the difference between the current storage level and the ideal storage level;
  determining a final deviation for each distributed energy resource of the second subgroup, the final deviation being the difference between the final storage level and the ideal storage level;
  determining a difference between the final deviation and the current deviation for each distributed energy resource of the second subgroup;
  determining a third subgroup of the fleet of distributed energy resources from the second subgroup to use to meet the energy need based on the difference between the final deviation and the current deviation for each distributed energy resource of the second subgroup; and
determining the allocation of the energy adjustment among the first subgroup and the third subgroup; and
instructing the distributed energy resources of the first subgroup and the third subgroup to make energy adjustments according to the allocation to meet the energy need.

Clause 25. A method for optimizing the dispatch of energy, the method comprising:
determining an energy need;
determining a subgroup of a fleet of distributed energy resources based on an ideal storage deviation value to use each distributed energy resources to meet a portion of the energy need; and
causing the subgroup of the distributed energy resources to make energy adjustments to meet the energy need.

Clause 26. A method for optimizing the dispatch of energy, the method comprising:
determining an energy need;
determining a subgroup of a fleet of distributed energy resources based on a difference between:
  a final level of deviation from an ideal storage level of each distributed energy resource and a final storage level of distributed energy resource when used to dispatch energy to meet the energy need; and
  a current level of deviation from the ideal storage level of each distributed energy resource and a current storage level of each distributed energy resource; and
causing the subgroup of the distributed energy resources to make energy adjustments to meet the energy need.

Clause 27. A method for optimizing the dispatch of energy, the method comprising:
determining an energy need;
determining a subgroup of a fleet of distributed energy resources by:
  determining a current storage level of each distributed energy resource;
  determining an ideal storage level of each distributed energy resource in the second subgroup;
  determining a final storage level of each distributed energy resource, the final storage level being the storage level of the distributed energy resource if it is used to dispatch energy to meet the allocation of the energy adjustment;
  determining a current deviation for each distributed energy resource, the current deviation being the difference between the current storage level and the ideal storage level;
  determining a final deviation for each distributed energy resource, the final deviation being the difference between the final storage level and the ideal storage level;
  determining a difference between the final deviation and the current deviation for each distributed energy resource; and
  determining the subgroup of the fleet of distributed energy resources to use to meet the energy need based on the difference between the final deviation and the current deviation for each distributed energy resource; and
causing the subgroup of the distributed energy resources to make energy adjustments to meet the energy need.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

What is claimed is:
1. A method for optimizing the dispatch of energy, the method comprising:
determining, by a processor, an energy need;

determining, by the processor, a first subgroup of a fleet of distributed energy resources to use to meet the energy need based on an economic cost to use each distributed energy resource to meet a portion of the energy need;

determining, by the processor, a second subgroup of the fleet of distributed energy resources to use to meet the energy need based on a storage cost to use each distributed energy resource to meet the portion of the energy need, wherein:

the storage cost indicates a difference between a current deviation and a final deviation;

the current deviation being a difference between a current storage level and an ideal storage level; and the final deviation being a difference between a final storage level and the ideal storage level;

in response to determining the first subgroup and the second subgroup, transmitting an instruction, by the processor, to the distributed energy resources of the first subgroup and second subgroup to perform an energy adjustment comprising one of (i) discharging energy, (ii) consuming energy, or (iii) both (i) and (ii) to meet the energy need; and performing the energy adjustment by the distributed energy resources of the first subgroup and second subgroup in response to receiving the transmitted instruction.

2. The method of claim 1, wherein the first subgroup is determined by:

ranking the distributed energy resources from a lowest economic cost to a highest economic cost; and selecting the distributed energy resources in order of the ranking starting from the lowest economic cost.

3. The method of claim 1, wherein the second subgroup is determined by:

ranking the distributed energy resources from a lowest storage cost to a highest storage cost; and selecting the distributed energy resources in order of the ranking starting from the lowest storage cost.

4. The method of claim 1, wherein determining the first subgroup of the fleet of distributed energy resources is further based on a health value of each distributed energy resource.

5. The method of claim 4, wherein determining the first subgroup comprises:

determining the economic costs of a group of distributed energy resources of the fleet of distributed energy resources are within a range; and selecting distributed energy resources from the group to include in the first subgroup based on the health value of each distributed energy resource of the group.

6. The method of claim 1, wherein determining the second subgroup of the fleet of distributed energy resources is based on a health value of each distributed energy resource.

7. The method of claim 6, wherein determining the second subgroup comprises:

determining the storage costs of a group of distributed energy resources of the fleet of distributed energy resources are within a range; and selecting distributed energy resources from the group to include in the second subgroup based on the health value of each distributed energy resource of the group.

8. The method of claim 1, wherein determining the second subgroup comprises:

ranking the distributed energy resources from a lowest storage cost to a highest storage cost; and selecting the distributed energy resources in order of the ranking from the lowest storage cost until the first subgroup and the second subgroup of distributed energy resources are sufficient to meet the energy need.

9. A dispatch optimization system comprising at least one processing device and at least one non-transitory computer-readable medium storing data instructions which, when executed by the at least one processing device, cause the dispatch optimization system to:

determine an energy need;

determine a first subgroup of a fleet of distributed energy resources to use to meet the energy need based on an economic cost to use each distributed energy resource to meet a portion of the energy need;

determine a second subgroup of the fleet of distributed energy resources to use to meet the energy need based on a storage cost to use each distributed energy resource to meet the portion of the energy need, wherein:

the storage cost indicates a difference between a current deviation and a final deviation;

the current deviation being a difference between a current storage level and an ideal storage level; and the final deviation being a difference between a final storage level and the ideal storage level:

in response to determining the first subgroup and the second subgroup, transmit an instruction to the distributed energy resources of the first subgroup and second subgroup to perform an energy adjustment comprising one of (i) discharging energy, (ii) consuming energy, or (iii) both (i) and (ii) to meet the energy need; and perform the energy adjustment by the distributed energy resources of the first subgroup and second subgroup in response to receiving the transmitted instruction.

10. The dispatch optimization system of claim 9, wherein to determine the first subgroup comprises to:

rank the distributed energy resources from a lowest economic cost to a highest economic cost; and select the distributed energy resources in order of the ranking starting from the lowest economic cost.

11. The dispatch optimization system of claim 9, wherein to determine the second subgroup comprises to:

rank the distributed energy resources from a lowest storage cost to a highest storage cost; and select the distributed energy resources in order of the ranking starting from the lowest storage cost.

12. The dispatch optimization system of claim 9, wherein to determine the first subgroup of the fleet of distributed energy resources is further based on a health value of each distributed energy resource.

13. The dispatch optimization system of claim 12, wherein to determine the first subgroup comprises to:

determine the economic costs of a group of distributed energy resources of the fleet of distributed energy resources are within a range; and select distributed energy resources from the group to include in the first subgroup based on the health value of each distributed energy resource of the group.

14. The dispatch optimization system of claim 9, wherein to determine the second subgroup of the fleet of distributed energy resources is based on a health value of each distributed energy resource.

15. The dispatch optimization system of claim 14, wherein to determine the second subgroup comprises to:

determine the storage costs of a group of distributed energy resources of the fleet of distributed energy resources are within a range; and select distributed energy resources from the group to include in the second subgroup based on the health value of each distributed energy resource of the group.

16. A non-transitory computer-readable medium that stores a set of instructions which when executed by a processor perform a method comprising:

determining an energy need;

determining a first subgroup of a fleet of distributed energy resources to use to meet the energy need based on an economic cost to use each distributed energy resource to meet a portion of the energy need;

determining a second subgroup of the fleet of distributed energy resources to use to meet the energy need based on a storage cost to use each distributed energy resource to meet the portion of the energy need, wherein:

the storage cost indicates a difference between a current deviation and a final deviation;

the current deviation being a difference between a current storage level and an ideal storage level; and the final deviation being a difference between a final storage level and the ideal storage level;

in response to determining the first subgroup and the second subgroup, transmitting an instruction to the distributed energy resources of the first subgroup and second subgroup to perform an energy adjustment comprising one of (i) discharging energy, (ii) consuming energy, or (iii) both (i) and (ii) to meet the energy need; and performing the energy adjustment by the distributed energy resources of the first subgroup and second subgroup in response to receiving the transmitted instruction.

17. The method of claim 1, further comprising determining the storage cost to use each distributed energy resource to meet the portion of the energy need.

18. The method of claim 17, wherein determining the storage cost to use each distributed energy resource to meet the portion of the energy need comprises, for each distributed energy resource:

determining the current deviation;

determining the final deviation; and determining the difference between the final deviation and the current deviation.

19. The dispatch optimization system of claim 9, wherein the data instructions, when executed by the at least one processing device, further cause the dispatch optimization system to:

determine the storage cost to use each distributed energy resource to meet the portion of the energy need.

* * * * *